United States Patent
Coxey

(10) Patent No.: US 10,645,913 B1
(45) Date of Patent: *May 12, 2020

(54) ANACONDA RATTLER FISHING TACKLE

(71) Applicant: Robert Coxey, Jacksonville, FL (US)

(72) Inventor: Robert Coxey, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/785,292

(22) Filed: Feb. 7, 2020

Related U.S. Application Data

(63) Continuation-in-part of application No. 16/545,857, filed on Aug. 20, 2019, now Pat. No. 10,602,728, which is a continuation-in-part of application No. 16/433,723, filed on Jun. 6, 2019, now Pat. No. 10,426,149, which is a continuation of application No. 16/156,823, filed on Oct. 10, 2018, now Pat. No. 10,357,025.

(60) Provisional application No. 62/570,513, filed on Oct. 10, 2017, provisional application No. 62/681,147, filed on Jun. 6, 2018, provisional application No. 62/681,180, filed on Jun. 6, 2018.

(51) Int. Cl.
*A01K 85/01* (2006.01)
*A01K 85/10* (2006.01)
*A01K 95/02* (2006.01)

(52) U.S. Cl.
CPC .............. *A01K 85/01* (2013.01); *A01K 85/10* (2013.01); *A01K 95/02* (2013.01)

(58) Field of Classification Search
CPC ................................. A01K 85/01; A01K 85/10
USPC ......................................................... 43/42.5
See application file for complete search history.

(56) References Cited

U.S. PATENT DOCUMENTS

| | | | |
|---|---|---|---|
| 1,600,618 A | 9/1926 | Bentley |
| 1,636,904 A | 7/1927 | Elwood |
| 1,698,193 A | 1/1929 | Geer |
| 1,867,555 A | 7/1932 | Hildebrandt |
| 2,131,858 A | 10/1938 | Ledrich |
| 2,212,294 A | 8/1940 | Larzelere |
| 2,674,823 A | 4/1954 | Gellings |
| 2,823,484 A | 2/1958 | Maurice |
| 3,935,660 A | 2/1976 | Plew |
| 4,730,410 A | 3/1988 | Sobieniak |
| 4,791,750 A | 12/1988 | Gammill |
| 4,888,909 A | 12/1989 | Adams |
| 5,001,856 A | 3/1991 | Gentry |
| 5,113,606 A | 5/1992 | Rinker |
| 5,121,568 A | 6/1992 | Lindmeyer |
| D372,954 S | 8/1996 | Coniglio et al. |
| 5,605,004 A | 2/1997 | Boullt et al. |
| 5,647,163 A | 7/1997 | Gorney |
| 5,887,379 A | 3/1999 | Lockhart |
| 6,158,162 A | 12/2000 | Loniello |
| 6,173,521 B1 | 1/2001 | Rockhill, Jr. |

(Continued)

*Primary Examiner* — Christopher P Ellis
(74) *Attorney, Agent, or Firm* — Joseph P. Kincart; Rogers Towers, P.A.

(57) ABSTRACT

An apparatus and methods relating to Anaconda Rattler tackle, a new type of lure that includes an audible generator (such as a rattle) attached to a bent blade to form wings and a lift surface, the wings may be formed in a direction generally the same as a direction of the lift surface or an opposite direction to the lift surface. The audible generator has some freedom of movement relative to the blade, allowing various noise profiles to be produced depending upon the type of audible generator chosen and the degree of bend in the blade. The blade may also have various holes to secure it to a wire and to change its hydrodynamic profile.

20 Claims, 6 Drawing Sheets

(56) References Cited

U.S. PATENT DOCUMENTS

| | | |
|---|---|---|
| 6,182,390 B1 | 2/2001 | Watkins |
| 6,601,336 B1 | 8/2003 | Link |
| 7,467,491 B1 | 12/2008 | Slocum |
| 7,614,178 B2 | 11/2009 | Hoyt |
| 8,042,298 B1 | 10/2011 | Yonekura et al. |
| 8,601,737 B2 | 12/2013 | Beer et al. |
| 8,910,415 B2 | 12/2014 | Farr |
| 9,032,660 B2 | 5/2015 | Vanacore |
| 10,123,520 B2 | 11/2018 | Furuya |
| 10,136,623 B2 | 11/2018 | Crain |
| 10,244,741 B1 | 4/2019 | Hancock |
| 2002/0148155 A1 | 10/2002 | Pasley |
| 2003/0145510 A1 | 8/2003 | Kohigashi et al. |
| 2004/0079022 A1 | 4/2004 | Owen et al. |
| 2006/0000138 A1 | 1/2006 | Druk |
| 2006/0242887 A1 | 11/2006 | Toman |
| 2009/0211144 A1 | 8/2009 | Murphy |
| 2010/0263258 A1 | 10/2010 | Hinz |
| 2010/0281756 A1 | 11/2010 | Lau |
| 2011/0119985 A1 | 5/2011 | Siler |
| 2011/0247260 A1 | 10/2011 | Schwartz |
| 2014/0059916 A1 | 3/2014 | Culver et al. |
| 2014/0150329 A1 | 6/2014 | Waldroup |
| 2017/0347635 A1 | 12/2017 | Sandefur |
| 2018/0310538 A1 | 11/2018 | Supinski |
| 2019/0216067 A1 | 7/2019 | Naig |

US 10,645,913 B1

ANACONDA RATTLER FISHING TACKLE

CROSS-REFERENCE TO RELATED APPLICATION

The present application is a continuation in part of application Ser. No. 16/545,857, filed on Aug. 20, 2019 and entitled "Diamondback Rattler Fishing Tackle", which in turn is a continuation in part to application Ser. No. 16/433,723, filed on Jun. 6, 2019 and entitled "Methods and Apparatus for Enhanced Audible Fishing Equipment with Heat Shrink", which in turn is a continuation in part to application Ser. No. 16/156,823, filed on Oct. 10, 2018 and entitled "Spinning Fishing Lure with Bead Elements with Auditory Attractant Characteristics", which in turn claims priority to U.S. Provisional application 62/570,513, filed on Oct. 10, 2017 entitled "Spinning Fishing Lure with Bead Elements with Auditory Attractant Characteristics". The present application also claims priority to U.S. Provisional App. Nos. 62/681,147 (filed on Jun. 6, 2018, and entitled Audible Enhanced Fishing Lure) and 62/681,180 (filed on Jun. 6, 2019, and entitled Methods and Apparatus for a Weighted Popping Flotation Device with Audible Attraction). The contents of each of the above referenced applications are expressly incorporated herein by reference and relied upon.

FIELD OF THE DISCLOSURE

The present disclosure relates to apparatus for tackle, including fishing lures and a method for making same.

BACKGROUND OF THE DISCLOSURE

Fishing is an activity enjoyed by many people around the world and can provide both food and sporting entertainment. Basic fishing equipment includes a fishing rod and reel that extends a fishing line to a hook. To increase the odds of catching a fish, various attractions may be placed on, adjacent to, or through the hook, such as bait, jigs, and lures. An ability to configure a fishing lure to attract fish to a hook without bait can provide an economical and easy solution when preparing to go fishing. While certain lures can work better at different locations or different times (or for different fish), there are advantageous aspects among many lures, generally these aspects include ways to entice a fish to strike the lure.

As fishing experts increase their understanding of which aspects are most effective at causing a fish to strike a lure, they are able to incorporate these aspects into devices used as fishing tackle.

SUMMARY OF THE DISCLOSURE

Accordingly, the present invention provides Anaconda Rattler fishing tackle in the form of lures generally including an audible generator, a formed blade with a convex area, a concave area and at least one apex, as well as a lift portion formed to be generally perpendicular to movement of fluid relative to the blade as the blade follows a path through water. One or more hooks, and in some embodiments at least one weighted hook are attached to the blade. The audible generator is in mechanical communication with the blade and a vibration emanates from the audible generator based at least upon movement of the blade.

Varying angles and depths of bends included in the formed blade produce different audible emanations, vibration and reflection patterns. An amount of audible emanations, vibration and reflection patterns may be selected based upon a type of marine environment, the type of marine life to be caught, weather conditions, water current, a speed of the Anaconda Rattler fishing tackle traversing through water, and other factors.

In some embodiments, the formed blade may have one or more holes therethrough. The holes may be positioned through the blade to contribute to one or more of: movement resulting from hydrodynamics, noise patterns, and lift of the blade.

BRIEF DESCRIPTION OF THE DRAWINGS

The accompanying drawings, which are incorporated in to and constitute a part of this specification, illustrate several embodiments of the disclosure. Together with the detailed description, the drawings serve to explain the principles of this disclosure.

DETAILED DESCRIPTION

The present disclosure provides generally for Anaconda Rattler fishing tackle ("Anaconda Rattler"), which is a specialized, easy-to-assemble lure capable of generating desirable noise patterns and lift as the Anaconda Rattler fishing tackle is placed within a water current or traverses through the water. The noise patterns and lift characteristics of the Anaconda Rattler fishing tackle enhance the ability of the Anaconda Rattler to attract fish to the Anaconda Rattler.

Figure 1:
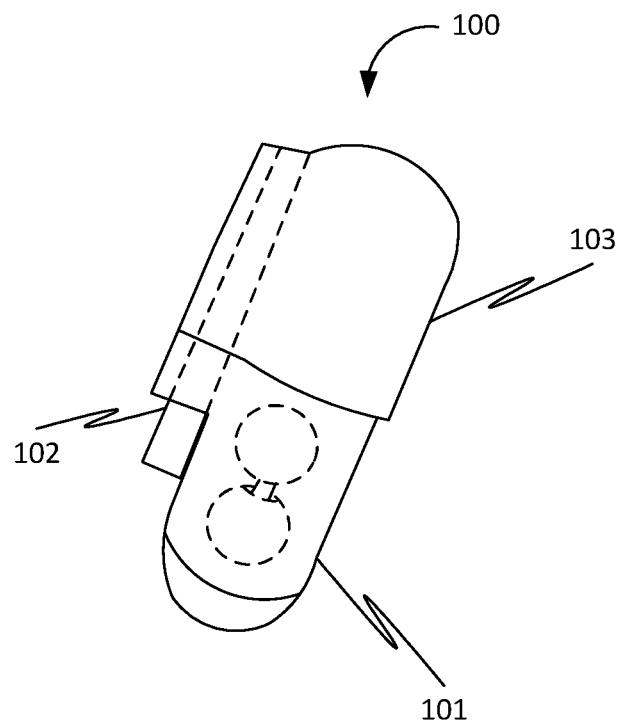
FIG. 1 illustrates an exemplary embodiment of an audible generator in accordance with the present invention.

In the following sections, detailed descriptions of examples and methods of the disclosure will be given. The description of both preferred and alternative examples of the invention are exemplary only; it is understood that variations, modifications, and alterations may be apparent. It is therefore to be understood that the examples do not limit the broadness of the aspects of the underlying disclosure as defined by the claims. As will be discussed further below, the order of presentation of various component of the present invention will follow an exemplary flow of an assembly method, Referring now to FIG. 1, the Anaconda Rattler 100 includes an audible generator 101, slide 102, and heat-shrink tubing 103. In some embodiments, the audible generator 101 includes a cylindrical casing and one or more strikers within the casing. The cylindrical casing is closed at both ends and encloses at least one striker comprising a moveable insert, such as a metallic or hard plastic ball bearing. At least one striker may be a ball, which is roughly spherical and has a diameter slightly smaller than a base diameter of an associated cylindrical casing. At least one striker can move freely within the casing to create a rattling sound when it impacts a closed end of the cylindrical casing or another striker, such as another metallic ball bearing.

The slide 102 comprises a hollow, roughly cylindrical tube that is open on both ends. In some exemplary embodiments, slide 102 preferably includes an inner diameter of between approximately 0.03-0.06 inches. Essentially, an inner diameter of the slide 102 should be large enough to slide a wire therethrough, but small enough to introduce an acceptable amount of drag to the Anaconda Rattler 100 when deployed in a marine environment. In some embodiments, the slide 102 is metallic.

The heat-shrink tubing 103 is a shrinkable plastic (or thermoplastic) tube used to bind a plurality of distinct components together. Many varieties of heat-shrink tubing comprised of various compositions are available. A suitable material may be based upon a degree of ruggedness and a type of water the Anaconda Rattler tackle will be deployed in. In exemplary embodiments of the present invention, the heat-shrink tubing 103 comprises water-resistant polyvinyl-chloride (known in the art as PVC), with or without any additives such as adhesives, colorants, or stabilizers, though any other thermoplastic material suitable for underwater applications is also appropriate. Other materials may include, for example a polyolefin or acrylated olefin. In exemplary embodiments, the heat-shrink tubing 103 is roughly cylindrical, comprising an inner surface and an outer surface. Additionally, in some embodiments, the heat-shrink tubing 103 comprises a substrate of heat-activated adhesive along an inner surface of the heat-shrink tubing 103.

The heat shrink tubing has a first diameter in an expanded state at a first temperature. The first temperature may generally be an ambient room temperature but may include a temperature up to about ninety degrees Celsius (194 degrees Fahrenheit). The heat shrink tubing will have a second diameter that is smaller than the first diameter. The second diameter is brought about by exposing the heat shrink tubing to a temperature sufficient to cause the heat shrink tubing towards an unexpanded state. In general, the tubing must be heated to a temperature of about ninety degrees Celsius to cause the heat shrink tubing to shrink towards its unexpanded state.

In exemplary embodiments, the slide 102 and the audible generator 101 are positioned adjacent to each other such that, in embodiments in which the slide 102 and audible generator are approximately cylindrical, the respective radial axes of the slide 102 and audible generator 101 are approximately parallel. Once so positioned, the slide 102 and audible generator 101 are placed within the heat-shrink tubing 103, which is subsequently heated and cooled to mold to the slide 102 and audible generator 101, thereby fixing the slide 102 and audible generator 101 in their respective places. This fixing is enhanced in embodiments in which the heat-shrink tubing 103 comprises the aforementioned heat-activated adhesive along an inner surface of the heat-shrink tubing 103.

Figure 2:
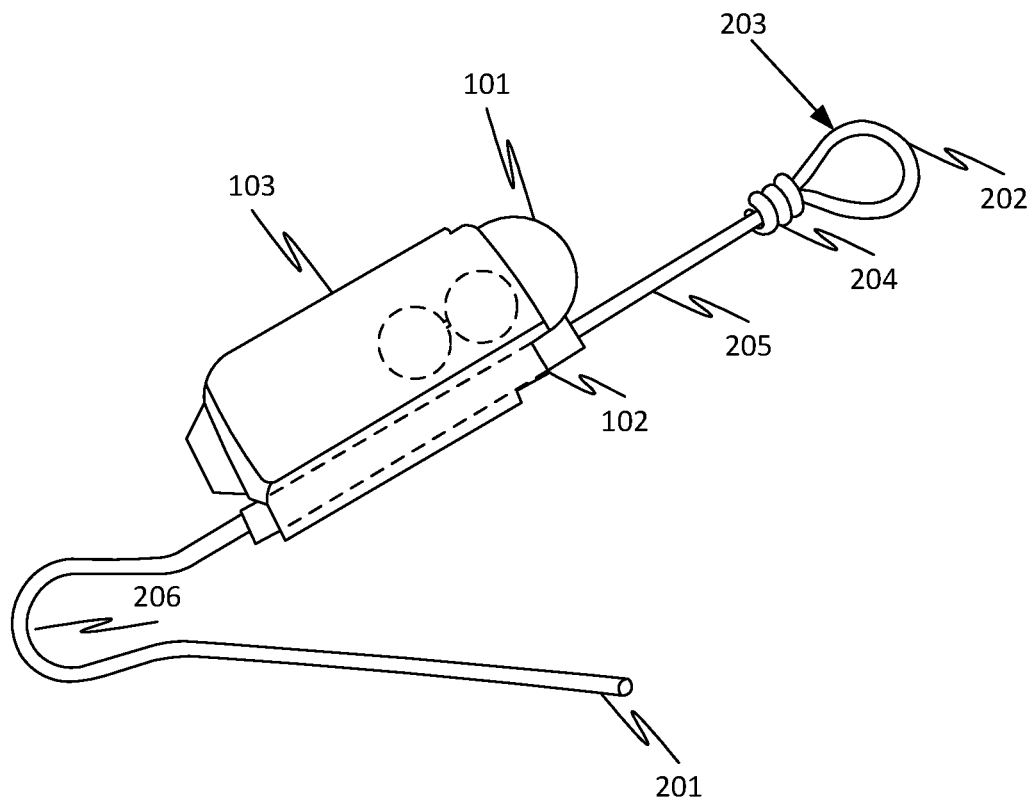
FIG. 2 illustrates an exemplary embodiment of an audible generator attached to a backbone wire, which is looped to form an eye.

Referring now to FIG. 2, after the slide 102 and audible generator 101 are molded or otherwise fixed together with the heat-shrink tubing 103, a wire 201 is passed through the inner diameter of the slide 102 (throughout the discussion, an exemplary order of assembly will be discussed, however, other orders of assembly are also within the scope of the invention, for example, in some embodiments, the wire 201 may be inserted through the slide 102 prior to fixing the slide to the audible generator). In exemplary embodiments, the wire 201 comprises a length of a metallic material. In some embodiments, an end of the wire 201 may be formed into an eye 202, through which a thin material may be passed, such as a fishing line. Forming of the eye 202 may be accomplished, for example, by looping an end portion 203 of the wire and twisting the end portion of the wire around a shaft 205 of the wire 204.

A second end of the wire 201 may be sufficiently long that, after being passed through the slide 102, the end may be bent to form an arcuate shape 206 that may be threaded through holes 302 in a blade 301 (illustrated in FIG. 3). The slide 102 and attached audible generator 101 may move freely in either or both of: axially (e.g. up and down the length of wire 201) or rotatingly (e.g., audible generator 101 has nearly complete 360° movement with respect to the wire 201).

By virtue of heat-shrink tubing 103, a user can deploy the combined wire 201, slide 102, and audible generator 101 in a variety of aquatic environments, with or without associated blades, hooks or lures discussed herein. This may allow a user to take advantage of the freedom of movement of the audible generator 101 without fear that the audible generator 101 will detach from wire 201.

Referring now to FIGS. 3A-3G, blades are illustrated that may be attached to wire 201 in a process for fashioning fishing tackle (such as a lure) according to embodiments of the present invention. Specifically, three possible embodiments (FIGS. 3A-3C) of blade 301 are shown, and end views (FIG. 3E, 3G) of a single apex blade (e.g. FIG. 3B) with a transvers bend 307 are illustrated.

Referring now to FIG. 3A-3F, blade 301 is an initially a flat piece of metal (which may be any of: stainless steel, shiny, colored or blackened) with a plurality of holes 302A, 302B, 303, and 304 (though not all embodiments require all holes) cut through the blade 301. Blade 301 may be spade-shaped that may be formed into a shape with one or more apexes, essentially forming one of: a shallow convex shape or a concave shape in relation to a lift surface 308. Ends 313-314 may be straight (as illustrated) or angular or arcuate. In some embodiments, blade 301 includes multiple blade wire holes 302A-B, through which wire 201 may be passed. In exemplary embodiments, blade 301 includes two blade wire holes 302A and 302B. The wire 201 may be passed through a first blade wire hole 302A, bent (or otherwise formed), and passed back through a second wire hole 302B. Wire 201 may then be wrapped around itself forming an eye, to secure the wire 201 to the blade 301 (the eye is illustrated in FIG. 4A as item 409).

In some embodiments, one or more blade wire holes 302A-302B may be located approximately along a central axis of flat blade 301 (or proximate to the geometric center of flat blade 301), generally, it is preferred that a second blade wire hole 302B may be located proximate to a first blade wire hole 302A. Blade hook hole 304 may be located proximate to an edge 313 of blade 301, and in some embodiments may be positioned along a central axis of blade 301.

In another aspect, in some embodiments, blade 301 may further include one or more blade hydrodynamic holes 303. In some such embodiments, the blade hydrodynamic holes 303 may be roughly circular or oval and have diameters larger than those of the blade wire holes 302A, 302B and/or the blade hook hole 304. The blade hydrodynamic holes 303 may be sized to reduce drag as the blade 301 traverses through water, the blade hydrodynamic holes 303 may also be sized to create additional noise similar to the noise produced by marine life as the blade is moved through the water and the water moves through the hydrodynamic holes. 303

Figure 3A:
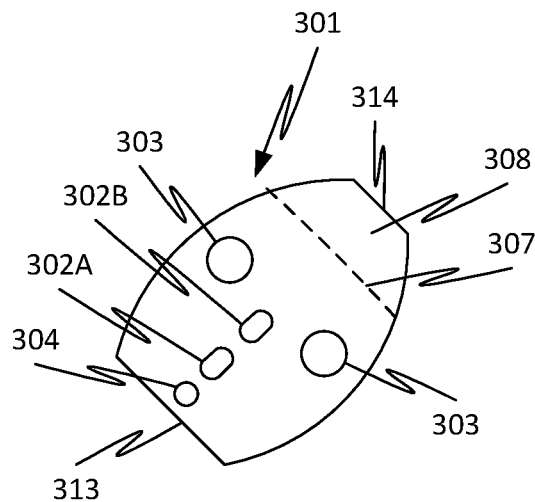
FIGS. 3A-3G illustrate types of blades that may be included on a lure with an audible generator.
Figure 3B:
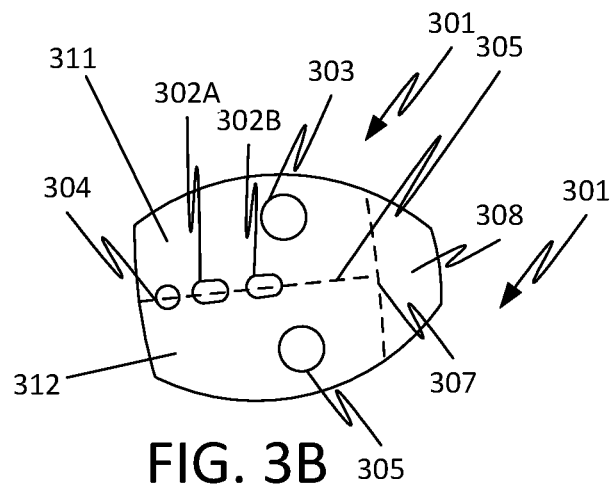
Figure 3C:
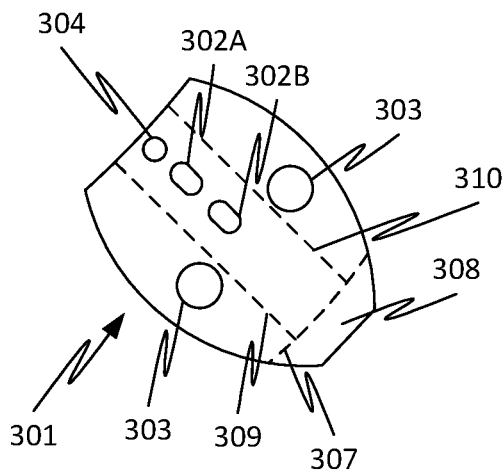
Figure 4A:
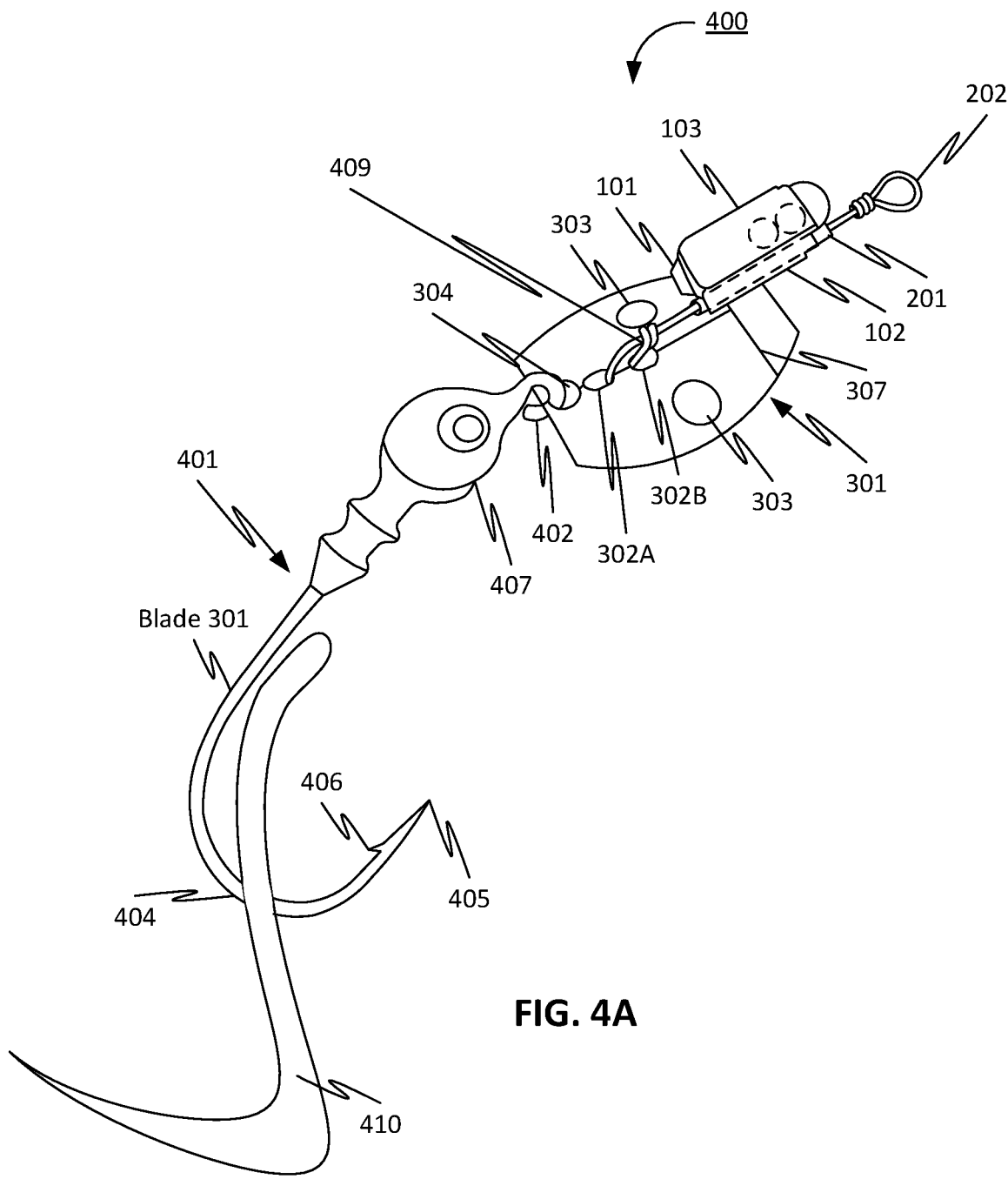
FIGS. 4A-4B illustrate a Anaconda Rattler tackle with a hook.

As illustrated in FIG. 3B, in some embodiments, blade 301 may be formed to include one or more apex portions along a length of the blade 301. The apex may be angular or a dome shape of varying curvatures and be formed via an axial blade bend 305, wherein an axial blade bend 305 refers to a bend along an axis of the blade 301, such as the axis defined by a line between the blade hook hole 304 and a point of the blade 301. The axial bend may form an apex on a convex side of the blade and a hollow on a concave side of the blade, wherein the convex side of the blade and the concave side of the blade comprise sufficient area and slope the cause movement in the blade as the blade is moved through water. The axial blade bend 305 will also divide the blade 301 into a first wing 311 and a second wing 312. The first wing 311 and the second wing 312 may be formed in a same direction as a lift surface 308 or an opposite direction of a lift surface 308 depending upon a concave or a convex axial blade bend 305.

Figure 3D:
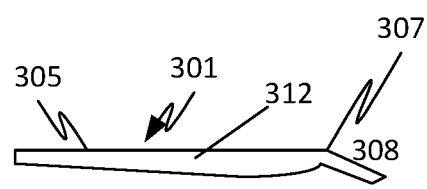
Figure 3E:
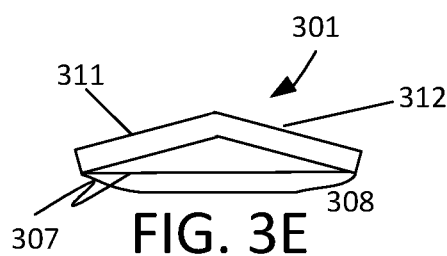
Figure 3F:
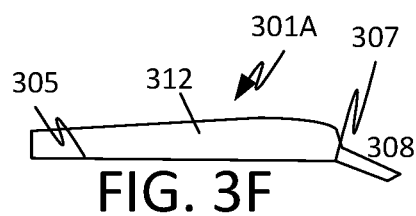
Figure 3G:
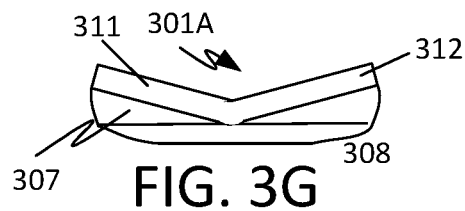

FIGS. 3D and 3E illustrate an axial blade bend 305 with a first wing 311 and a second wing 312 formed with via the axial blade bend 305 in a downward direction, transverse bend 307 is also formed in a downward direction. FIGS. 3F and 3G illustrate an axial blade bend 305 with a first wing 311 and a second wing 312 formed via the axial bend 305 in an upward direction, essentially an opposite direction as transverse bend 307 which is illustrated formed in a downward direction Embodiments of the present invention include variations of an axial blade bend 305 that result in forming a blade 301 with an apex angle, an apex curve, resulting in a dome shape or a concave bowl type shape depending upon whether the apex is upward or downward in relation to a lift surface 308 formed by as transverse blade bend. In some embodiments, an axial blade bend 305 is offset laterally from the axis of the blade 301. In some embodiments, such as the one demonstrated in FIG. 3C, the blade 301 may have a plurality of offset axial blade bends 305. It may be desirable in some such embodiments to create the offset axial blade bends 309-310 in a symmetrical fashion relative to the axis; for example. The distance from the axis to each offset axial blade bend 305 is preferably approximately equal, although other variations are within the scope of the invention. An offset axial blade bend 305 may reduce lift of the blade 301 as the blade passes through water.

Referring to FIGS. 3A-3E, some embodiments may include forming a transverse blade bend 307 by forming an end 314 of the blade 301 at an angle to a plane of blade 301. This creates a bend perpendicular to the axis of the blade 301 and the bend defines a lift surface 308 along a second flat side of the plate. The lift surface 308 is preferable of sufficient area to impart lift effects or diving effects as the blade passes through water. The upward or downward effect will depend upon an upward or downward formation of the lift surface 308.

FIGS. 3D-3E illustrates a blade 301 with a downward lift surface 308 in combination with downward wings 311-312. FIGS. 3F-3G illustrate a blade 301A downward lift surface 308 and upward wings 311-312.

Referring now to FIG. 4A, Anaconda Rattler tackle with hook 400 is shown. As discussed above, the Anaconda Rattler tackle with hook 400 comprises the molded slide 102 and audible generator 101 (as combined using the heat-shrink tubing 103), with the wire 201 passed through the slide 102 and movably attached to the blade 301 by passing the wire 201 through one or more blade wire holes 302A-302B. Blade 301 is attached to the hook 401 by looping the eye 402 of the hook through the blade hook hole 304. Both the hook 401 and the wire 201 (and accordingly, the audible generator 101 attached to the wire 201) are free to pivotally move about the blade 301. The audible generator 101 may produce different audio profiles depending upon the presence or absence of folds or bends in the blade 301. For example, if the blade 301 includes a transverse blade bend 307, the audible generator 101 may strike the blade 301 at a different point and different angle than if the blade 301 lacked the transverse blade bend 307.

The hook 401 includes an eye 402, shank 403, bend 404, and point 405. In some embodiments, the eye 402 is a generally circular loop, and rests movably in the blade hook hole 304. In some embodiments, the hook 401 may further comprise a weight 407. In some embodiments, the weight may have a weight of between 0.250 ounces and 1.75 ounces. In some embodiments, the weight 407 is fixedly attached to the shank 403 of the hook 401. The shank 403 is straight, metallic, and connects the eye 402 to the bend 404. The part of the bend 404 closest to the eye 402 begins a transition from the straight shank 403 to the curved bend 404 of the hook 401. The point 405 is the sharp end of the hook 401, designed to pierce through fish and aquatic obstacles. In some embodiments, the hook 401 further comprises a barb 406, a projection extending backwards from the point 405, which secures the fish from unhooking.

In some embodiments, a pliable worm type component 410 may be fixedly attached to the hook 401. The pliable worm type component 410 will accentuate movement of the Anaconda Rattler tackle 400 caused by the blade 301 moving through the water and causing turbulence in the water and movement in the Anaconda Rattler tackle 400.

Figure 4B:
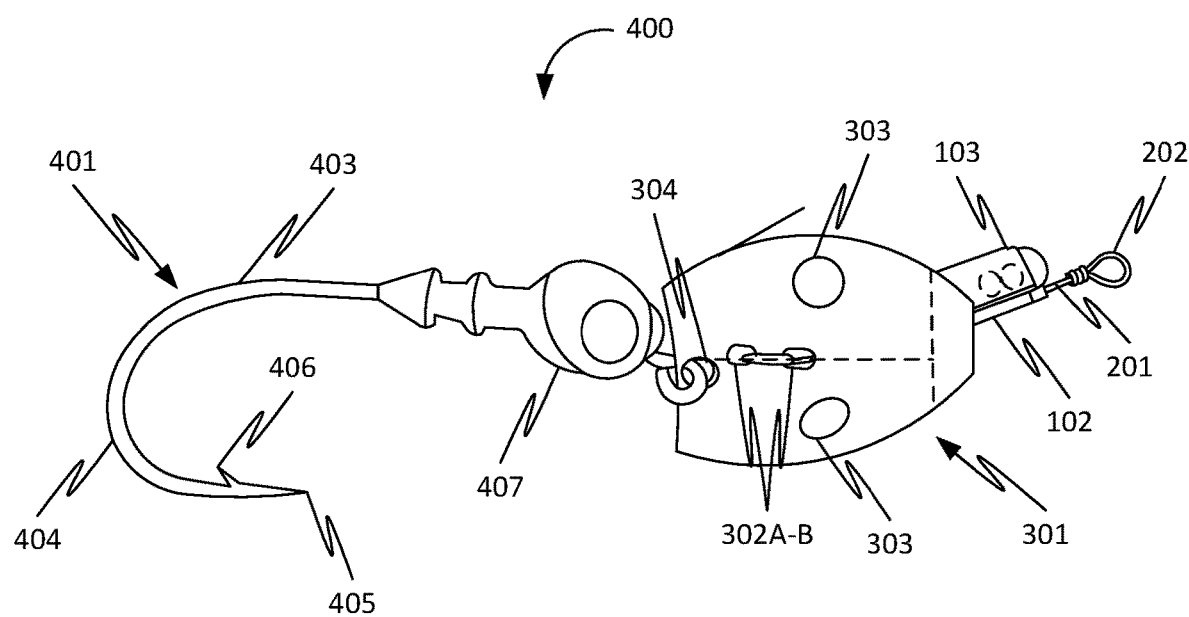

Referring now to FIG. 4B, an exemplary embodiment of the Anaconda Rattler tackle with hook 400 is shown. In this embodiment, blade 301 is a concave piece of metal having a transverse blade bend 307 in the +z direction. Wire 201 may be positioned on a convex side of the blade or a concave side of the blade according to how it is desired for the blade to interact with the movement of the blade 301. Movement of the blade may be increased by turbulence caused by the Anaconda Rattler with hook 400 as it drags through the water. When combined with weight 407, hook 401 sinks in the water, while the audible generator 101 makes noise and the Anaconda Rattler with hook 400 moves chaotically—like a small fish, as would be attractive to a larger fish—due to the hydrodynamic effects of the bended blade 301.

Figure 5:
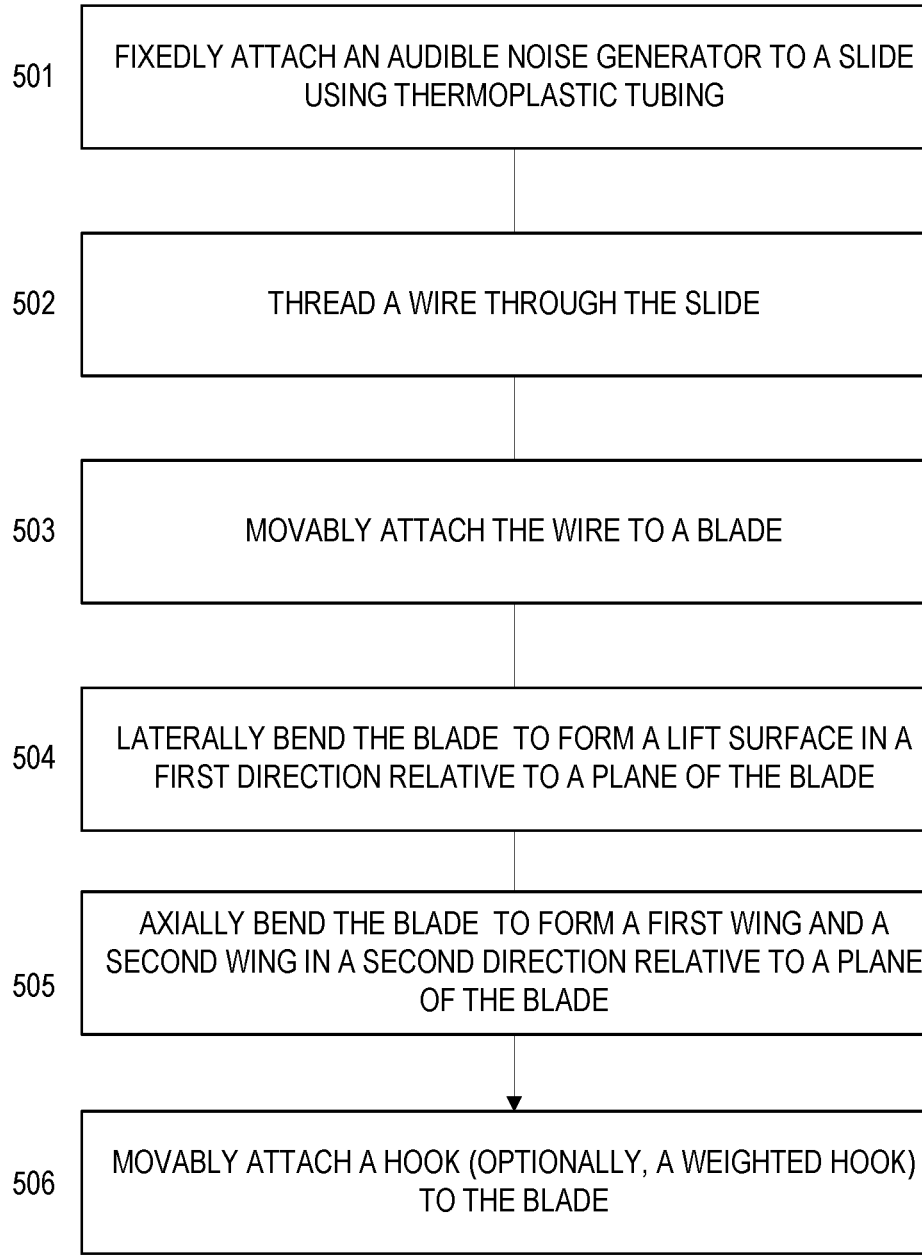
FIG. 5 illustrates an exemplary method for assembling Anaconda Rattler tackle.

Referring now to FIG. 5, a method for improved use of a fishing lure is shown. At step 501, an audible noise generator is attached to a slide using thermoplastic tubing, as described above. The audible noise generator may include a rattle. The audible generator may also be attached to the wire by heat shrink or other means suitable for deployment in a marine environment. The slide may comprise a thin tube through which a wire may be threaded. At step 502, the wire is threaded through the slide. At step 503, the wire is then attached to the blade through one or more holes on a surface of the blade.

At optional step 504, the blade may be bent according to one or more parameters discussed herein. These parameters may include the type of aquatic environment in which the lure is to be deployed or the type of marine life to be caught. In some embodiments, the blade may have one or more bends to generate a particular hydrodynamic profile of the Anaconda Rattler tackle and hook's movement through water. Step 504 includes laterally bending the blade to form a lift surface in a first direction relative to a plane of the blade. Step 505 includes axially bending the blade to form a first wing and a second wing in a second direction relative to the plane of the blade. The first and second directions relative to the plane of the blade may include, for example a generally same direction or a generally opposite direction. In some exemplary embodiments, the blade may have one or two axial concave bends in a +z direction and a transverse bend in a −z direction.

At step 506, the hook is attached to a blade. The hook may be attached to the blade by a wire, or any other attachment means suitable for deployment in a marine environment. In some embodiments, the hook comprises a weight, which weight has between 0.250 and 1.75 ounces.

A number of embodiments of the present disclosure have been described. While this specification contains many specific implementation details, this should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. Anaconda Rattler tackle comprising:
   an audible generator positioned adjacent to a generally cylindrical hollow slide;
   a thermoplastic sleeve fixedly attaching the audible generator to the slide;
   a wire with a first end and a second end, said wire threaded through the slide, with a first end of the wire formed into a first eye on a first end of the slide and the second end extending through the second end of the slide, said first eye of a suitable size for attaching to a fishing line;
   a blade comprising plate of rigid material in a generally spade shape with a first straight side and a second straight side and two arcuate sides, a first blade wire hole and second blade wire hole through plate of rigid material, the wire is threaded through the first blade wire hole and the second blade wire hole and formed into a second eyelet movably attaching the slide to the blade, the blade additionally comprising an apex formed by a transverse blade bend and a lift surface formed by an axial blade bend, the transverse blade bend defining a first wing and a second wing each of the first wing and the second wing formed in a direction opposite to a direction of formation of the lift surface; and
   a hook attached to the plate via a blade hook hole formed through the rigid material of the plate.

2. The Anaconda Rattler tackle of claim 1 wherein a convex side of the blade and a concave side of the blade formed by the apex comprise sufficient area and slope the cause movement in the blade as the blade is moved through water.

3. The Anaconda Rattler tackle of claim 2 wherein the lift surface in the plate is of sufficient area to cause the Anaconda Rattler tackle to rise as it moves through water.

4. The Anaconda Rattler tackle of claim 3, wherein the blade additionally comprises two hydrodynamic holes, one hole on either side of the axial bend, each hole of sufficient diameter to effect movement of the blade as the blade moves through water.

5. The Anaconda Rattler tackle of claim 4, wherein the blade comprises a blade hook hole.

6. The Anaconda Rattler tackle of claim 5, further comprising a hook, which hook comprises an eye and is movably attached to the blade via the blade hook hole.

7. The Anaconda Rattler tackle of claim 6, wherein the hook comprises a weight comprising between about 0.250 ounces and 1.75 ounces of material.

8. The Anaconda Rattler tackle of claim 7, wherein the audible generator comprises a rattle.

9. The Anaconda Rattler tackle of claim 8, wherein the rattle comprises a glass cylinder, wherein the glass cylinder comprises a glass shell, a hollow tube with a tube diameter, and a metallic ball with a ball diameter, wherein the ball diameter is less than the tube diameter.

10. The Anaconda Rattler tackle of claim 8, wherein an axis of the wire and an axis of the blade are parallel.

11. The Anaconda Rattler tackle of claim 10 additionally comprising a pliable worm type component fixedly attached to the hook.

12. A method for making Anaconda Rattler tackle, the method comprising the steps of:
- positioning an audible noise generator adjacent to a slide;
- placing the audible generator and the slide within a heat shrink tubing with a first diameter in an expanded state;
- heating the heat shrink tubing to a temperature sufficient cause the heat shrink tubing to shrink to a second diameter;
- fixedly attaching an audible noise generator to a slide via the thermoplastic tubing at the second diameter;
- threading a wire through the slide;
- bending a blade comprising a rigid material in a generally spade shape with a first straight side and a second straight side and two arcuate sides; and
- movably attaching the wire to the blade via a hole formed in the blade.

13. The method of claim 12, wherein the step of bending the blade comprises bending the blade along an axis of the blade.

14. The method of claim 12, wherein the step of bending the blade comprises bending the blade along an axis offset from a central axis of the blade.

15. The method of claim 12, wherein the blade comprises a hydrodynamic hole.

16. The method of claim 15, wherein the blade comprises a blade hook hole.

17. The method of claim 16, further comprising the step of: movably attaching a hook comprising an eye to the blade hook hole via the eye of the hook.

18. The method of claim 17, further comprising the step of: attaching a weight of between 0.250 and 1.75 ounces to the hook.

19. The method of claim 18 wherein the step of attaching a weight to the hook comprises forming lead around a shaft of the hook.

20. The method of claim 19, wherein the audible generator comprises a rattle.

* * * * *